Nov. 8, 1932.   J. R. STRICKLEN ET AL   1,887,250
APPARATUS FOR THE VULCANIZATION OF RUBBER TIRES AND TUBES
Filed Jan. 3, 1930   4 Sheets-Sheet 3
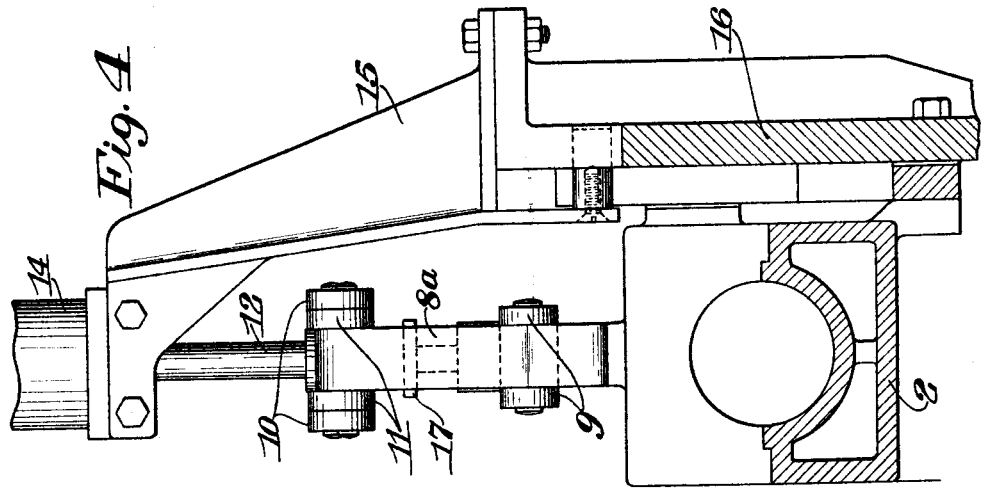
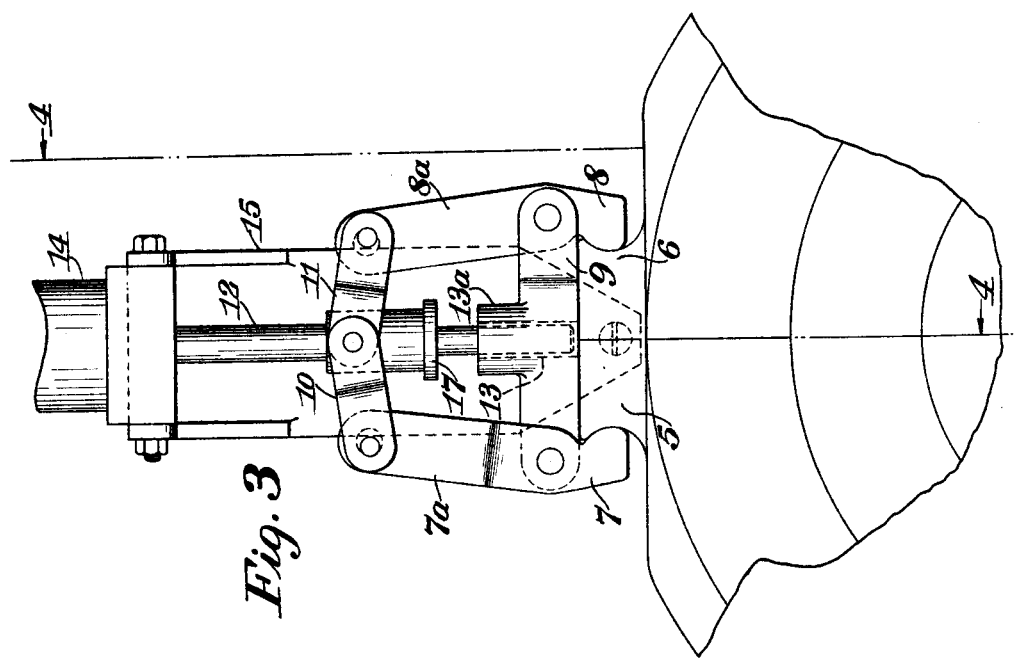

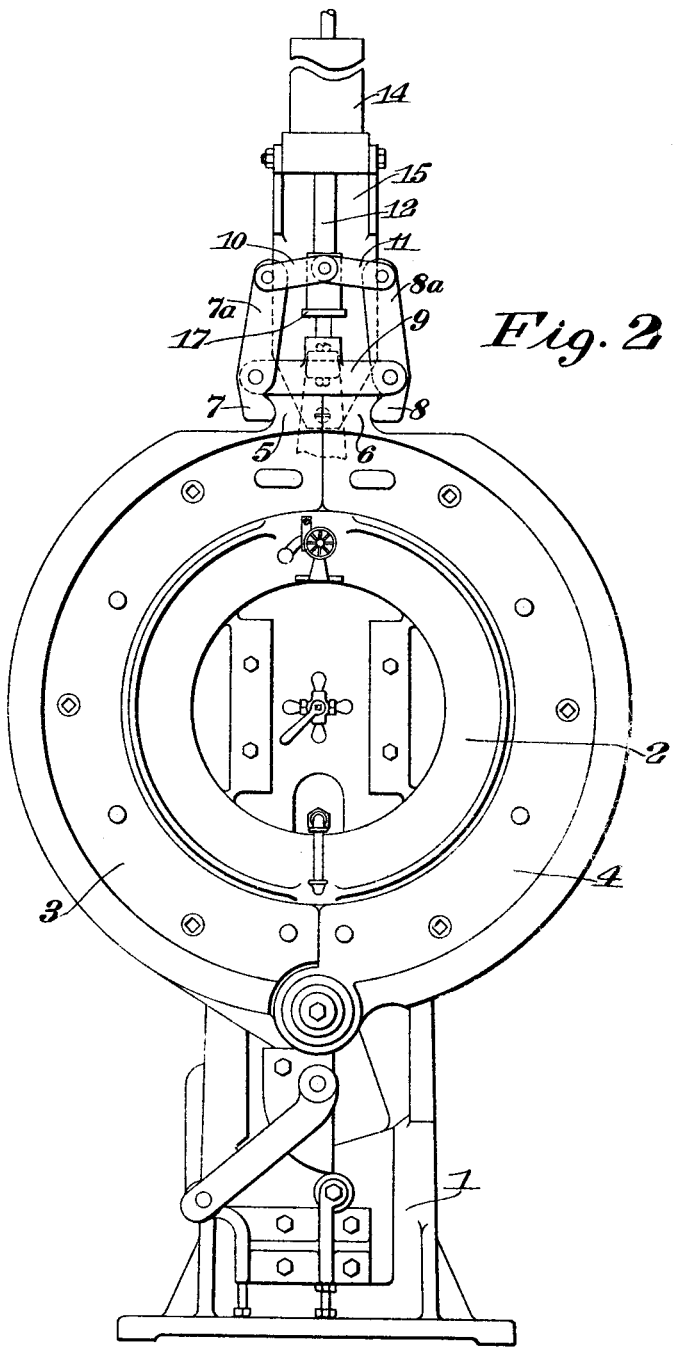

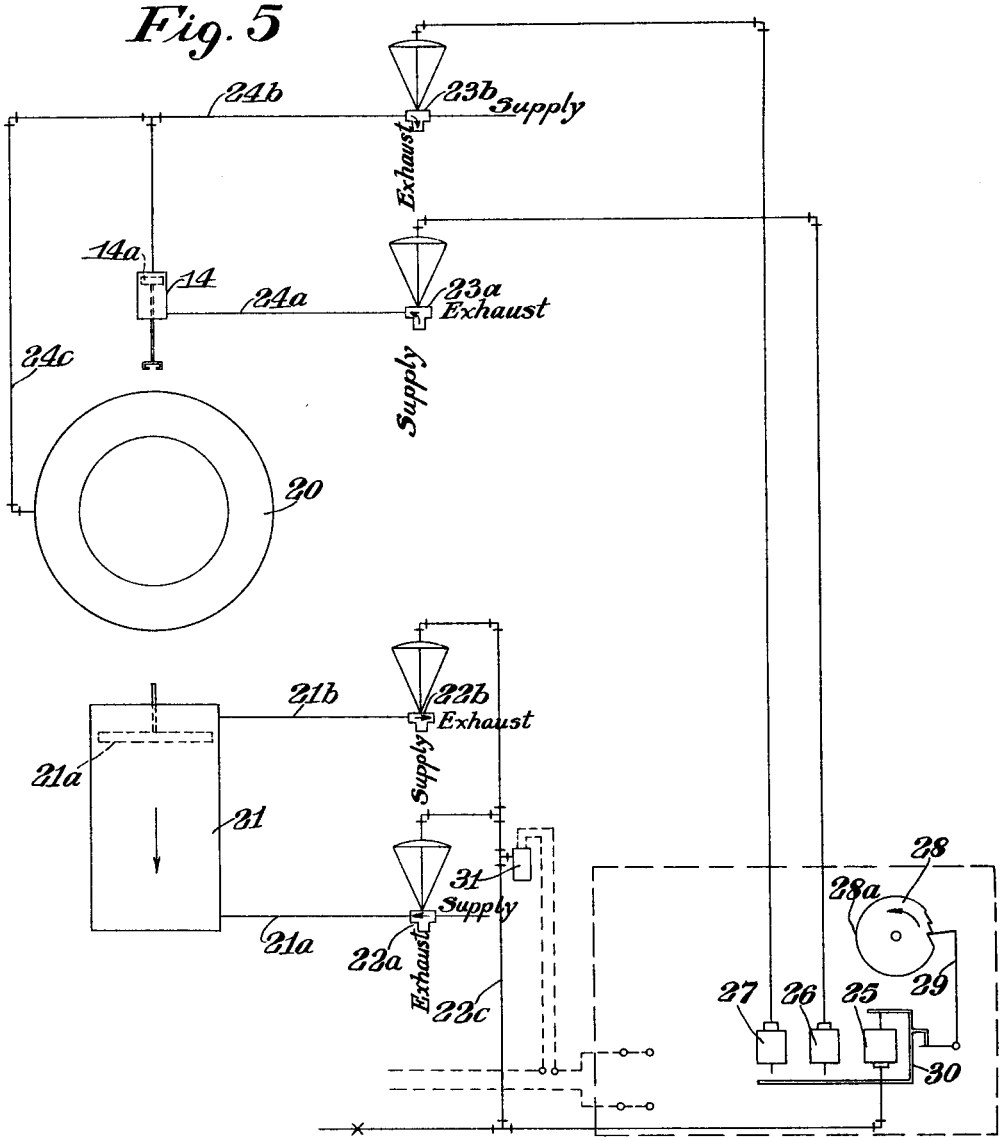

Patented Nov. 8, 1932

1,887,250

UNITED STATES PATENT OFFICE

JOHN R. STRICKLEN AND SAMUEL A. FRAINE, OF AKRON, OHIO, ASSIGNORS TO TAYLOR INSTRUMENTS COMPANIES, OF ROCHESTER, NEW YORK, A CORPORATION OF NEW YORK

APPARATUS FOR THE VULCANIZATION OF RUBBER TIRES AND TUBES

Application filed January 3, 1930. Serial No. 418,233.

This invention relates to apparatus of the type used for the vulcanization of rubber tires and tubes and more in particular to mechanism for automatically controlling the cycle of operation for carrying out the vulcanization.

The invention finds special application in that form of vulcanizing apparatus in which inner tubes are singly treated and an operator has charge of a certain number of vulcanizing units.

It is the general object of the invention to provide vulcanizing apparatus which reduces the amount of attention to a practical minimum.

The principal object of the invention is the provision of means for preventing a premature or accidental opening of the apparatus.

For a full understanding of the invention, the principle of operation on which it is based and its engineering significance, reference is made to the accompanying drawings, wherein Fig. 1 is a front view of an apparatus embodying the invention, in its normal or open position;

Fig. 2 is a similar view showing the apparatus in closed position;

Fig. 3 is a front view, on an enlarged scale, of the most important detail of the invention, in the operative position as indicated in Fig. 2;

Fig. 4 is a view taken on section line 4—4, Fig. 3; and

Fig. 5 is a diagrammatic representation of the mechanism for operating the apparatus.

Figure 1:
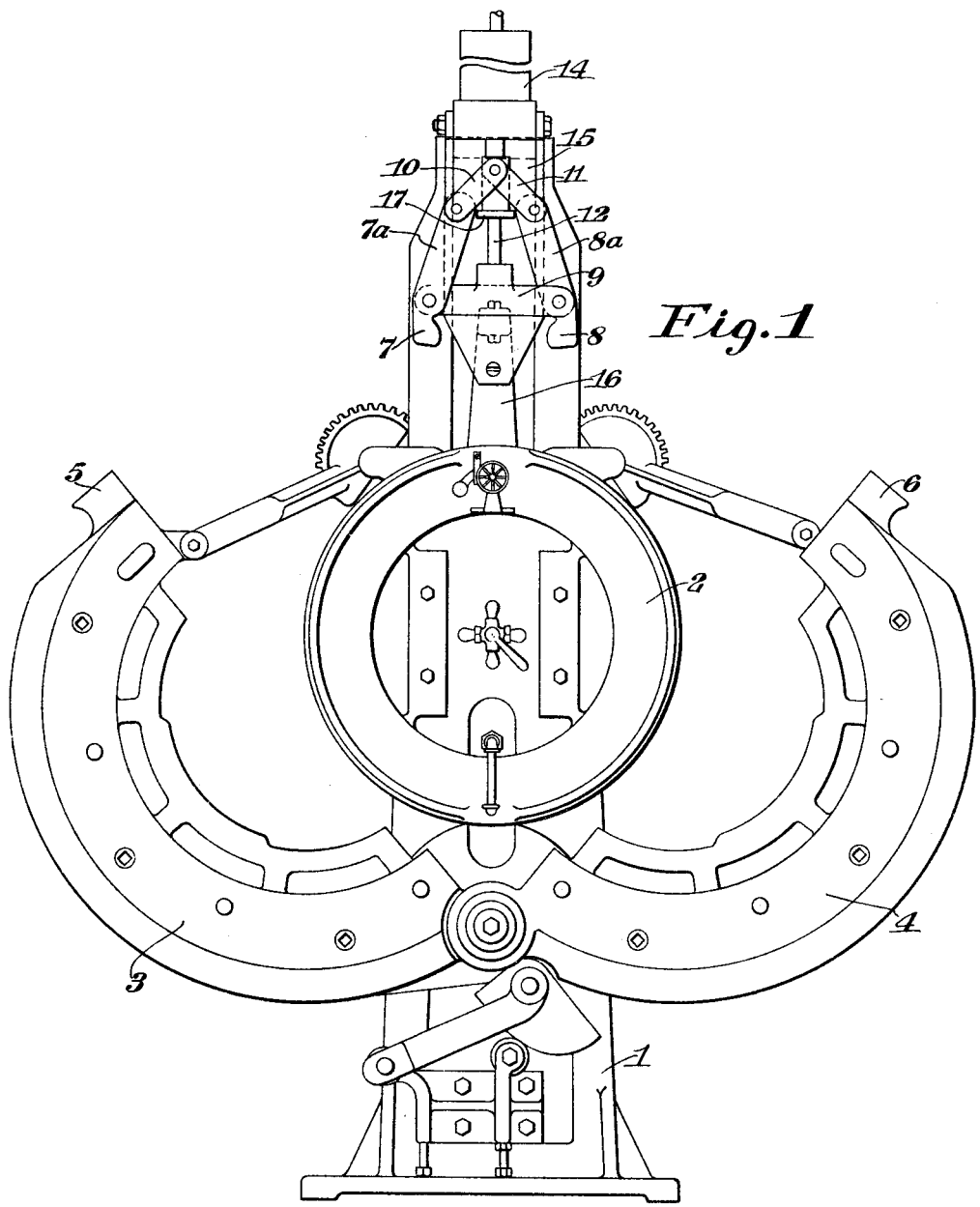

Having reference to Figs. 1 and 2, the drawings show a vulcanzing apparatus of a well known form of construction for vulcanizing inner tubes, composed generally of a standard 1 defining at its upper end a base 2 for mounting the inflated tube and two complementary parts 3 and 4 mounted for motion toward and away from one another to form in closed position the vulcanizing chamber.

The vulcanizing apparatus or press as it is commonly termed, does not form a part of the invention. The invention itself comprises means for automatically carrying out the cycle of vulcanization and maintaining the two complementary parts in safely interlocked relation during the curing cycle.

To this end, the complementary parts 3 and 4 are provided adjacent their contact faces with abutments 5 and 6 for engagement by a locking mechanism.

This locking mechanism is preferably composed of a pair of clamping jaws 7 and 8 forming the short ends of two levers pivotally mounted at the opposite ends of a bar 9, the other longer ends 7a and 8a extending upwardly and being pivotally connected by means of a pair of links 10 and 11 with a rod 12. The rod 12 together with the links 10 and 11 form a toggle system for spreading the power levers 7a and 8a to cause the jaws 7 and 8 to exert a powerful grip upon the abutments 5 and 6. The rod 12 is axially movable independently of the bar 9, but the latter is provided with a perforation 13 extending upwardly through a boss 13a to serve as a slide way for the rod so that the bar and the rod are maintained in a definite axial relation to each other.

The rod 12 preferably is a piston rod extending from a pneumatic cylinder 14 wherein the piston may be either raised or lowered by the admission of compressed air to either end of the cylinder.

The cylinder is mounted on a bracket 15, which in turn is attached to the stationary plate 16 rising from the standard 1.

When the piston rod 12 is in upper position, as illustrated in Fig. 1, the parts 3 and 4 may be closed. After the press is closed, the rod 12 may be lowered to lock the parts 3 and 4 against accidental opening. When the rod 12 descends the bar 9 will come to rest on the upper surface of the abutments 5 and 6 but the rod continues to move downwardly through the opening 13 causing the spreading of the links 7a and 8a through the links 10 and 11 and a corresponding clamping action by the jaws 7 and 8 upon the abutments 5 and 6. It will be observed that at the end of the locking operation the links 10 and 11 are in opposition defining practically a straight line assuring a maximum resistance against opening movement. By this arrangement a very small power plant for operating the locking mechanism, is sufficient.

The unlocking operation is initiated by an upward movement of the rod 12, which causes movement of the toggle joint including links 10 and 11 to release the grip of jaws 5 and 6. When the links 10 and 15 have reached a position in which they exert an upward pull on the arms 7a and 8a, the locking mechanism including the bar 9 is bodily lifted clear of the two abutments 5 and 6 and the press may again be opened.

In order to prevent the pivotal connections of link 10 and arm 7a, on the one hand and link 11 and arm 8a, on the other hand, from moving too far toward the rod 12, i. e. to or past the dead center position thereof, we provide a collar 17 on rod 12.

The operation or the practical application of the mechanism may be fully understood by reference to Fig. 5, wherein 20 represents the inner tube to be cured and to be mounted on the stationary base 2. The mechanism for opening and closing the press i. e. for moving the complementary parts 3 and 4 to the positions shown in Figs. 1 and 2 respectively, includes a pneumatic cylinder 21, connections 21a and 21b to the opposite ends of the cylinder and diaphragm operated three-way valves 22a and 22b for controlling the flow of the pressure fluid.

The pneumatic cylinder 14 is controlled by the diaphragm operated three-way valves 23a and 23b in the connections 24a and 24b respectively. The pneumatic connection 24c to the tube 20 is controlled by one of the valves, in the particular instance by valve 23b, so that the pressure fluid is admitted to the tube 20 concurrently with the admission of the pressure fluids to the cylinder to effect the locking action. In the illustration, the piston 14a is in its upper position holding the locking mechanism in the position shown in Fig. 1. The valve 23a is so positioned as to allow the pressure fluid to flow into the lower end of the cylinder and maintain the piston in its upper position. At the same time, the valve 23b is positioned to shut off the supply and maintain communication of the connections 24b and 24c with the atmosphere.

Valves 22a, 22b, 23a and 23b are interdependently controlled by a time-cycle device including the relay valves 25, 26 and 27 actuated by the time-controlled cam disk 28, follower 29 and frame 30. Valve 25 controls the flow of pressure fluid to the diaphragms of valves 22a and 22b and valves 26 and 27 separately control the flow of pressure fluid to the diaphragms of valves 23a and 23b.

The cam disk 28 is normally at rest and in a position to indefinitely maintain the different valves in the condition described. When the clock driving the cam is started, the operating cycle begins and continues until the operation is finished at which time the clock is automatically stopped and leaves the cam disk in precisely the same position as before.

As the follower 29 is forced up the first incline on the cam 28, valves 25, 26 and 27 are successively actuated to first cause the operation of diaphragm valves of valves 22a and 22b so as to effect movement of the piston 21a in downward direction to close the press; then cause the operation of valve 23a to shut off the pressure fluid from the lower end of cylinder 14 while simultaneously connecting the lower end of the cylinder 14 with the atmosphere, which allows the piston 14a and the locking mechanism connected with it to drop by gravity; and to finally cause the operation of valve 23b to open the connection of the pressure-fluid supply to the top of the cylinder 14 and to the tube 20. Just as soon as the pressure fluid enters the tube 20, the rod 12 is forced down to positively actuate the locking mechanism and maintain it in locking position. After the follower 29 has reached the top of the first incline, it travels along the concentric portion 28a until finally by successive steps, which cause an actuation of valves 25, 26 and 27 and the operation of the cylinders 21 and 14 in inverse order, it arrives again in its original position ready for the starting of the cycle.

An electro-pneumatic switch 31, pneumatically connected with the pressure-fluid connection 22c to the diaphragms of valves 22a and 22b and electrically connected with the clock mechanism for driving the cam disk 28 (not shown) is automatically operated when the pressure-fluid connection 22c is changed and thus automatically stops the clock at the end of the cycle.

The mechanism for controlling the cycle of operation does not form, as such, a part of the invention, but has been generally referred to in order to more fully explain the application of the invention.

We claim:

1. In apparatus of the character described, the combination with a treater chamber composed of two complementary parts movable toward and away from one another and normally open to receive the material to be treated, of means for interlocking the complementary parts in closed position, comprising abutments on the complementary parts relatively close to the contact faces thereof and clamping mechanism for engagement with the abutments, said mechanism including clamping jaws and means operative to move the clamping jaws into clamping position and to thereafter actuate the clamping jaws to increasingly force the abutments toward each other.

2. In apparatus of the character described, the combination with a treater chamber composed of two complementary parts movable toward and away from one another and normally open to receive the material to be treated, of means for interlocking the complementary parts in closed position, comprising abutments on the complementary parts relatively close to the contact faces thereof, mechanism movable as a unit into and out of interlocking engagement with said abutments, including a bar, clamping levers supported intermediate their ends on the bar to define relatively short clamping jaws and relatively long power levers, respectively, a rod axially movable relatively to the said bar, two levers pivotally connected to said power levers and the rod to define a toggle joint, and means for reciprocating the rod.

3. In apparatus of the character described, the combination with a treater chamber composed of two complementary parts movable toward and away from one another and normally open to receive the material to be treated, of means for interlocking the complementary parts in closed position, comprising abutments on the complementary parts relatively close to the contact faces thereof, mechanism movable as a unit into and out of interlocking engagement with said abutments, including a bar, clamping levers supported intermediate their ends on the bar to define relatively short clamping jaws and relatively long power levers, respectively, a rod mounted for axial movement independently of the bar, two levers pivotally connected to said power levers and the rod, respectively, to define a toggle joint, means for maintaining the bar substantially at right angle to the rod and means for reciprocating the rod.

4. In apparatus of the character described, the combination with a treater chamber composed of two complementary parts movable toward and away from one another and normally open to receive the material to be treated, of means for interlocking the complementary parts in closed position, comprising abutments on the complementary parts relatively close to the contact faces thereof, mechanism movable as a unit into and out of interlocking engagement with said abutments, including a bar, clamping levers supported intermediate their ends on the bar to define relatively short clamping jaws and relatively long power levers, respectively, a rod axially movable in a vertical direction independently of the bar, two levers pivotally connected to said power levers and the rod, respectively, to define a toggle joint, means for maintaining the bar substantially at right angle to the rod and means for operating the rod, including means for reciprocating it between an upper and a lower position and means operative to initiate the downward movement by allowing it to drop by gravity and to positively move it after it has reached its gravity position.

5. In apparatus of the character described, the combination with a treater chamber composed of two complementary parts movable toward and away from one another, of means for interlocking the complementary parts in closed position, comprising two abutments on the complementary parts relatively close to the contact faces thereof, said abutments having on opposite sides recessed walls for the reception of clamping jaws and mechanism movable as a unit into and out of interlocking engagement with the abutments, including a pair of clamping jaws for engagement with said recessed walls, a support for bodily moving the clamping jaws into position adjacent the recessed walls and means on the support for forcing the clamping jaws into engagement with the recessed walls when the clamping jaws are in said position.

In testimony whereof we affix our signatures.

SAMUEL A. FRAINE.
JOHN R. STRICKLEN.